(12) United States Patent
Helmer et al.

(10) Patent No.: US 8,806,974 B2
(45) Date of Patent: Aug. 19, 2014

(54) DEVICE FOR TRANSMITTING MOVEMENTS AND COMPONENTS THEREOF

(75) Inventors: Patrick Helmer, Preverenges (CH);
Francois Conti, Saint-Blaise (CH);
Patrice Rouiller, Trelex (CH);
Sebastien Grange, Sion (CH)

(73) Assignee: Novint Technologies, Inc., Rockville Centre, NY (US)

( * ) Notice: Subject to any disclaimer, the term of this patent is extended or adjusted under 35 U.S.C. 154(b) by 1707 days.

(21) Appl. No.: 11/815,889

(22) PCT Filed: Feb. 10, 2006

(86) PCT No.: PCT/EP2006/001245
§ 371 (c)(1),
(2), (4) Date: Apr. 17, 2008

(87) PCT Pub. No.: WO2006/084744
PCT Pub. Date: Aug. 17, 2006

(65) Prior Publication Data
US 2008/0223165 A1 Sep. 18, 2008

(30) Foreign Application Priority Data
Feb. 11, 2005 (EP) .................................... 05002893

(51) Int. Cl.
*G05G 1/00* (2008.04)
*G05G 9/047* (2006.01)
*B25J 17/00* (2006.01)
*B25J 17/02* (2006.01)
*B25J 18/00* (2006.01)

(52) U.S. Cl.
CPC ............ *B25J 17/0266* (2013.01); *Y10S 901/15* (2013.01)
USPC .................. 74/471 XY; 74/469; 74/490.01; 901/15

(58) Field of Classification Search
USPC ....... 74/480 R, 469, 471 XY, 479.01, 490.01, 74/490.04–490.07; 901/15, 18, 19, 21, 901/27–29; 414/709, 735, 917; 33/559
See application file for complete search history.

(56) References Cited

U.S. PATENT DOCUMENTS 2,121,906 A * 6/1938 Dunn ........................... 74/89.21
4,806,068 A * 2/1989 Kohli et al. ................... 414/735

(Continued)

OTHER PUBLICATIONS

"Kinematic analysis of a new parallel machine-tool: the Orthoglide," by P. Wenger and D. Chablat. Advances in Robot Kinematics, 2000, pp. 305-314.

*Primary Examiner* — David M Fenstermacher
*Assistant Examiner* — Jake Cook
(74) *Attorney, Agent, or Firm* — Downs Rachlin Martin PLLC

(57) ABSTRACT

A device for transmitting movements comprising a parallel kinematics transmission structure adapted to provide at least one degree of freedom including three translational degrees of freedom, the parallel kinematics transmission structure further comprising a base member (2), a moveable member (4), and at least one parallel kinematics chain (6) coupling the base member (2) and the moveable member (4), each parallel kinematics chain (6) having a first arm (8) moveable in a movement plane wherein the movement planes are at a distance to a symmetry axis (40), and each parallel kinematics chain (6) comprising a second arm (10) coupled to the moveable member (4), wherein a first end (18) of the second arm (10) is adapted to be coupled to the first arm (8) and a second end (16) of the second arm (10) is adapted to be coupled to the moveable member (4).

36 Claims, 12 Drawing Sheets

(56) References Cited

U.S. PATENT DOCUMENTS

| | | | |
|---|---|---|---|
| 5,219,266 A * | 6/1993 | Reboulet et al. | 414/733 |
| 5,333,514 A * | 8/1994 | Toyama et al. | 74/490.06 |
| 5,553,509 A * | 9/1996 | Somes | 74/89.2 |
| 5,847,528 A * | 12/1998 | Hui et al. | 318/568.1 |
| 6,024,576 A * | 2/2000 | Bevirt et al. | 434/262 |
| 6,105,455 A * | 8/2000 | Rosheim | 74/490.06 |
| 6,108,589 A * | 8/2000 | Sasahara et al. | 700/245 |
| 6,154,198 A * | 11/2000 | Rosenberg | 345/161 |
| 2001/0019692 A1 * | 9/2001 | Ehrat | 414/735 |
| 2004/0250644 A1 * | 12/2004 | Gosselin et al. | 74/490.04 |

* cited by examiner

US 8,806,974 B2

DEVICE FOR TRANSMITTING MOVEMENTS AND COMPONENTS THEREOF

CROSS-REFERENCE TO RELATED APPLICATIONS

This application is a national stage application under 35 U.S.C. 371 of PCT application PCT/EP2006/001245, filed Feb. 10, 2006, which claims priority to EP 05 002 893.5, filed Feb. 11, 2005, each of which is incorporated by reference herein. This application is related to PCT application PCT/EP2006/001244, filed Feb. 10, 2006, which is incorporated herein by reference.

FIELD OF THE INVENTION

The present invention generally relates to devices for transmitting movements and components thereof.

BACKGROUND OF THE INVENTION

The increasing need for enhanced human-computer interaction (HCI) is pushing for new interfaces that allow humans and machines to exchange a wider range of information. As one example among these new interfaces, so called haptic devices, that is, active interface devices applying tactile sensation and control to interaction with computer applications, are promised a place of choice. Haptic devices provide users with force-feedback information on the motion and/or force that they generate. Not only does haptic interaction make difficult manipulation tasks possible or easier, it also opens the door to a wide range of new applications in the fields of simulation and assistance to human operators.

Numerous applications may benefit from haptic technology, ranging from teleoperation to scaled manipulation, as well as simulators and surgical aids. Moreover, force-feedback devices are moving to the consumer market, and are invading the gaming industry as well as unexpected other areas.

To give the user a precise feeling of the virtual model or remote robot position environment, the mechanical structure of the haptic device should have low inertia, high stiffness with low friction and no backlash. Parallel kinematics mechanisms are known for their high stiffness and low inertia, which enables large bandwidth transmission of forces.

Known devices however suffer from their complex, expensive and large design and in same cases unreliable and unprecise performance.

There is a need to provide a simple, compact and/or low priced movement transmission device or assembly and components for such a device, for example, to be used for a haptic device, a manipulator, a measuring device, or the like.

SUMMARY OF THE INVENTION

A first aspect of the present invention is directed to a device for transmitting movements. The device comprises a parallel kinematics transmission structure providing at least one degree of freedom. The parallel kinematics transmission structure comprises a base member, a moveable member, and at least one parallel kinematics chain coupling the base member and the moveable member. The parallel kinematics chain has a first arm moveable in a movement plane which extends in a distance or spaced relation to the symmetry axis.

Another aspect of the present invention is directed to a device for transmitting movements, comprising a parallel kinematics transmission structure adapted to provide at least three degrees of freedom including three translational degrees of freedom, said parallel kinematics transmission structure further comprising a base member, a moveable member and at least one parallel kinematics chain coupling the base member and the moveable member. Each parallel kinematics chain has a first arm moveable in a movement plane wherein the movement planes are at a distance to a symmetry axis. Further, each parallel kinematics chain comprises a second arm coupled to the moveable member wherein a first end of the second arm is adapted to be coupled to the first arm and a second end of the second arm is adapted to be coupled to the moveable member.

Another aspect of the present invention is directed to a haptic device for providing a user with force-feedback information comprising a device according to first aspect of the present invention.

Another aspect of the present invention is directed to a manipulator for providing movements of at least one degree of freedom to a manipulation member, comprising a device according to the first aspect of the present invention.

Another aspect of the present invention is directed to a measuring system for providing at least one degree of freedom to a sensor element, comprising a device according to the first aspect of the present invention.

A further aspect of the present invention is directed to a kinematics chain for a device for transmitting movements comprising a parallel kinematics transmission structure providing at least one degree of freedom. The parallel kinematics transmission structure comprises a base member and a moveable member. The kinematics chain comprises a first arm adapted to be coupled to the base member and comprising a curved portion.

Another aspect of the present invention is directed to a device for transmitting movements comprising a parallel kinematics transmission structure providing at least one degree of freedom with respect to a symmetry axis, the parallel kinematics transmission structure comprising a base member, a moveable member, and at least one parallel kinematics chain coupling the base member and the moveable member, each parallel kinematics chain being a kinematics chain according to the second aspect of the present invention, the first arm of each kinematics chain being moveable in a movement plane wherein at least one of the movement planes extends in a spaced relation to the symmetry axis.

A still further aspect of the present invention is directed to a transmission member for a device for transmitting movements comprising an actuator for providing movements to be transmitted and a base member. The transmission member comprises a first arm adapted to be coupled to the base member and comprising a base portion and a curved portion, and at least one engagement means for engagement with the actuator of the device for transmitting movements from the actuator to the transmission member.

Another aspect of the present invention is directed to a device for transmitting movements comprising a parallel kinematics transmission structure providing at least one degree of freedom with respect to a symmetry axis, the parallel kinematics transmission structure comprising a base member, a moveable member, at least one parallel kinematics chain coupling the base member and the moveable member, each parallel kinematics chain comprising, as first arm, a transmissions member according to the third aspect of the present invention, each first arm being moveable in a movement plane wherein at least one of the movement planes extends in a spaced relation to the symmetry axis.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

DESCRIPTION OF PREFERRED EMBODIMENTS

Figure 1:
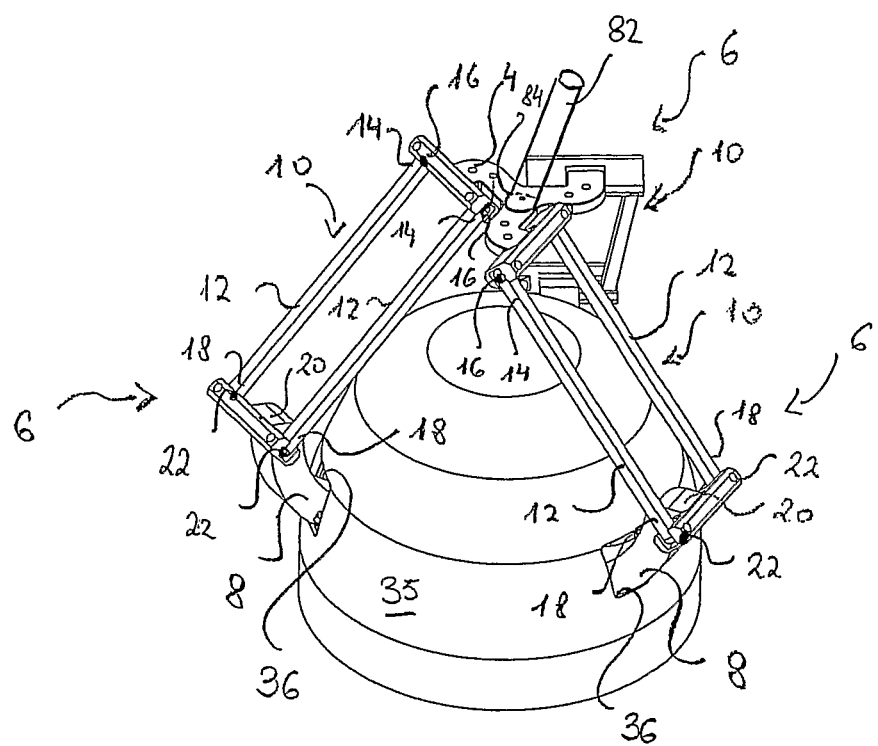
FIG. 1 to 12 show preferred embodiments of the present invention.
Figure 2:
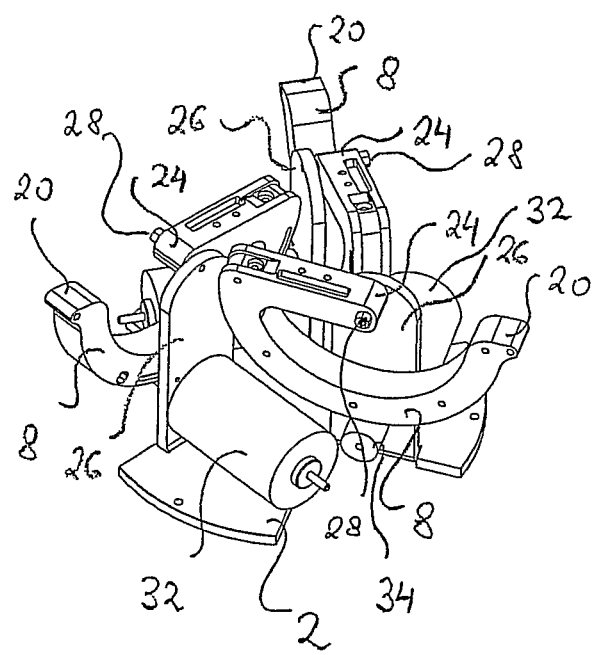

FIGS. 1 and 2 illustrate a device for transmitting movements in form of a so-called haptic device according to a preferred embodiment of the present invention. Before proceeding further with the detailed description of FIGS. 1 and 2, however, a few items of preferred embodiments will be discussed.

According to an embodiment, the present invention provides or serves as basis for a device for transmitting movements which preferably comprise a parallel kinematics transmission structure, and particularly for such a device in form of a so-called haptic device or system of a force-reflecting control interface, such as a hand controller for computers, game consoles, simulators or other systems, and to a movement transmission device for a parallel kinematics manipulator or a parallel kinematics measuring system.

Following preferred embodiments of a device for transmitting movements according to the present invention are shortly addressed.

Each of the movement planes may extend in a spaced relation to the symmetry axis.

Each parallel kinematics chain may comprise a first arm coupled to the base member and moveable in the respective movement plane.

The first arm may be rotateable with respect to a rotation axis.

The first arm may comprise a curved portion.

The curved portion may form a segment of an annulus, the center of which being intersected by the rotation axis of the respective first arm.

The first arm may comprise a base portion extending from a first end of the curved portion.

The base portion may extend from the first end of the curved portion in a direction radial with respect to the curved portion.

The first arm may comprise a first end rotationally mounted to a mounting member extending from the base member.

The rotation axis of the first arm may extend through the first end of the first arm.

The first end of the first arm may be provided by a free end of the base portion of the first arm.

Associated to each parallel kinematics chain, an actuator may be provided for moving the associated parallel kinematics chain in the respective movement plane.

The actuator and the first arm may be coupled for moving the first arm.

The actuator may be coupled with the first arm at its curved portion.

The actuator may comprise an actuator rotational axis extending perpendicular to the movement plane of the associated parallel kinematics chain.

The actuator may comprise an output shaft extending from a body of the actuator and being coupled with the first arm by at least one of a friction engagement and at least one cable arrangement.

The actuator may be mounted to the mounting member of the respective parallel kinematics chain.

Each parallel kinematics chain may comprise a second arm coupled to the moveable member.

The second arm may comprise at least two parallel linking bars.

A first end of the second arm may be coupled to the first arm and a second end of the second arm may be coupled to the moveable member.

The device may further comprise a housing, which has, for each of the parallel kinematics chains, an opening through which the respective parallel kinematics chain may be moved and which has dimensions to accommodate a cross-section of the first arm of the respective parallel kinematics chain.

At least one of the parallel kinematics chains may comprise a flexible hinge.

The first arm and the base member may be coupled by a flexible hinge.

The second arm and the moveable member may be coupled by a flexible hinge.

The first arm and the second arm may be coupled by a flexible hinge.

The flexible hinge may be made from one piece or the flexible hinge and at least one of the base member, the respective first arm, the respective second arm and the moveable member are made from one piece.

In an embodiment, a device of transmitting movements according to the present invention may be incorporated in a haptic device for providing a user with force-feedback information.

In an embodiment, the haptic device may comprise a sensor for measuring the aperture angle of each first arm, wherein the position of the moveable member is calculated based on the results of the measurement.

The haptic device may further comprise a wrist module arranged in series with the parallel transmission structure and adapted to provide at least one rotational degrees of freedom.

The wrist module may be adapted to provide a tactile feedback.

The haptic device may further comprise control keys, control wheels, force grippers or other elements used for a human computer interface.

The haptic device may further comprise a force sensor located on the moveable member, preferably underneath the wrist module.

In an embodiment, a device of transmitting movements according to the present invention may be incorporated in a manipulator for providing movements of at least three degrees of freedom to a manipulation member.

In an embodiment, a device of transmitting movements according to the present invention may be incorporated in a measuring system for providing at least three degrees of freedom to a sensor element.

Referring now to FIGS. 1 and 2, a device for transmitting movements in form of a so-called haptic device according to a preferred embodiment of the present invention is described. Only for illustrative purposes, it is assumed that the haptic device may be used as force-reflecting control interface, such as a hand controller for computer. Further possible applications include force-reflecting control interfaces for game consoles, simulators or other comparable systems, and for a parallel kinematics manipulator or a parallel kinematics measuring system.

The device according to the preferred embodiment includes a base member or base plate 2 and a moveable member 4. The base member 2 and the moveable member 4 are connected via three kinematics chains 6.

Each kinematics chain 6 includes a first arm or main arm 8 and a second arm or secondary arm 10. A more detailed description of the first arm 8, its operation and its function is given below with reference to FIGS. 6 and 7.

Each second arm 10 may be considered as parallelogram including two linking bars 12. At one end 14, each linking bar 12 is coupled with the moveable member 4 by a joint or hinge 16. At their opposing ends 18, each linking bar 12 is coupled with an end 20 of its associated first arm 8 by a joint or hinge 22.

Each second arm 10, particularly each linking bar 12, has two rotational degrees of freedom at both ends. To provide this functionality, coupling of the second arms 10 to the moveable member 4 and the associated first arms 8 may be accomplished by cardanic elements or pairs of non-parallel rotateable connections or articulations, such as ball bearings, plain bearings or flexible hinges. In one embodiment, in case of non-parallel rotateable connections or articulations, it is preferred that their respective axes are perpendicular and that they do intersect, but an offset distance between the two axes is admissible (see also FIG. 12). The outer-most rotatable connections of each linking bar, i.e. the one connecting the bar to the moveable member on one side and the one connecting the bar to the first arm on the other side, need to have axes parallel to each other and to the axis of the rotatable connection of the first arm. In an embodiment, the inner-most rotateable connections of each linking bar must have axes parallel to each other, preferably perpendicular to the outer-most rotateable connections. As each of the linking bars must fullfill these conditions, the outer-most rotateable connection of each linking bar for a given side must have coincident axes and perform identical rotations. Thus, in this embodiment, this outer-most connection may be made common to at least two bars, as seen on FIG. 12.

Alternatively, each second arm 10, particularly each linking bar 12, has two rotational degrees of freedom on one side and three rotational degrees of freedom on the other side. To provide this functionality, coupling of the second arms 10 to the moveable member 4 and the associated first arms 8 may be accomplished by spherical ball joints at one or at both ends. Thus, the linking bars 12 may rotate around their own axis although this additional degree of freedom is not necessarily required for the operation of the device.

Coupling of the second arms 10 to the moveable member 4 and the associated first arms 8 may also include connections having, on the side towards the second arm 10, a common base and, on the side towards the moveable member 4 and/or the first arm 8, at least two bases.

However, in either case, it is preferred to use as joints 22, for coupling the second arms 10 to the moveable member 4 and the associated first arms 8, flexible hinges or hinge articulations, such as for example known from EP 1 113 191 A1.

A preferred embodiment for a flexible coupling of the first arms 8, the second arms 10, the base member 2 and the moveable member 4 is described below with reference to FIG. 12.

At the end 24 opposite its end 20 coupled with its associated second arm 10, each first arm 8 is coupled with a mounting member 26, which in turn is fixedly mounted to the base member 2 and, thus, coupled with the base member 2. The mounting members 26 and the base member 2 may also be formed from one piece.

Each first arm 8 is coupled with its associated mounting member 26 such that each first arm 8 may be rotated or pivoted with respect to the associated mounting member 26 and, thus, with respect to the base member 2. In the preferred embodiment, each first arm 8 is coupled to its associated mounting member 26 by a rotational shaft 28 extending through its associated mounting member 26 and its respective end 24.

Mounting members 26 extend from the base member 2 in a direction substantially perpendicular to the base member's plane. At a portion between the part 28 mounted to the base member 2 and the opposite free end 20, with which the first arms 8 are coupled, a rotational actuator 32 is mounted to each mounting member 26.

Rotational actuators 32 may be, for example, standard DC motors or brush-less motors. In order to reduce the torque output and power consumption necessary to provide for desired movements of the kinematics chains 6. The present invention utilizes a new single stage transmission described below in greater detail with respect to FIGS. 6 to 12.

Each actuator 32 comprises a rotational output shaft 34 extending through the respective mounting member 26. Each of the output shafts 34 is coupled with a respective one of the first arms 8 for moving the same. Preferred embodiments concerning the coupling of the output shafts 34 and the first arms 8 are described below with respect to FIGS. 8 to 10.

Means or units for angular position detection of the first arm(s), such as potentiometers, optical encoders, magnetic encoders are preferably associated to the output shafts 34 or any other part of the actuators 32 suitable to provide angular information (e.g. rotors).

As may been seen from FIG. 1, the preferred embodiment comprises a housing 35. Housing 35 may be attached to the base member 2 or includes on its lower side the base member 2.

The housing 35 has three openings 36, through which the first arms 8 are guided. Due to the design and the operation of the first arms 8, as set forth below in detail, each of the openings 36 has—seen in the direction the respective first arm is guided therethrough—a cross-section just slightly larger to the cross-section of the part of the first arm 8 to be guided therethrough. The openings 36 may be designed in such a manner because, in operation, movements of the first arms 8 take place, in the area of the openings 36, along a virtually straight line. Therefore, the cross-section of the openings 36 may be designed as close as possible to the cross-section of the first arms 8. Here, "as close as possible" indicates that the first arms 8 do not substantially engage or do not contact at all the edges of the openings (i.e. the parts of the housing 35 defining the openings 36) such that movements of the first arms 8 affected, e.g. by friction.

In case, for example, the first arms 8 have a rectangular or circular cross-section, the openings 36 may also have a rectangular or circular cross-section, respectively, just a little larger. This results in an enhanced coverage of components inside the housing 35 such that no or at least less foreign matter (e.g. dust, moisture, humidity, small particles etc.) may enter the housing 35 possible leading to a failure of the internal components and the whole device. By means of Further, the risk of injuries of a user (e.g. squeezing or pitching of a finger) is reduced.

In a further preferred embodiment not shown in the drawings, the openings 36 are provided with a elastic, compliant ring or coating, which is in contact with the respective first arm 8 such that arm movements are not (substantially) affected but that a fluid tight sealing between the first arms 8 and the housing 35 is achieved. A fluid tight sealing may be also achieved by bellows (not shown).

Figure 3:
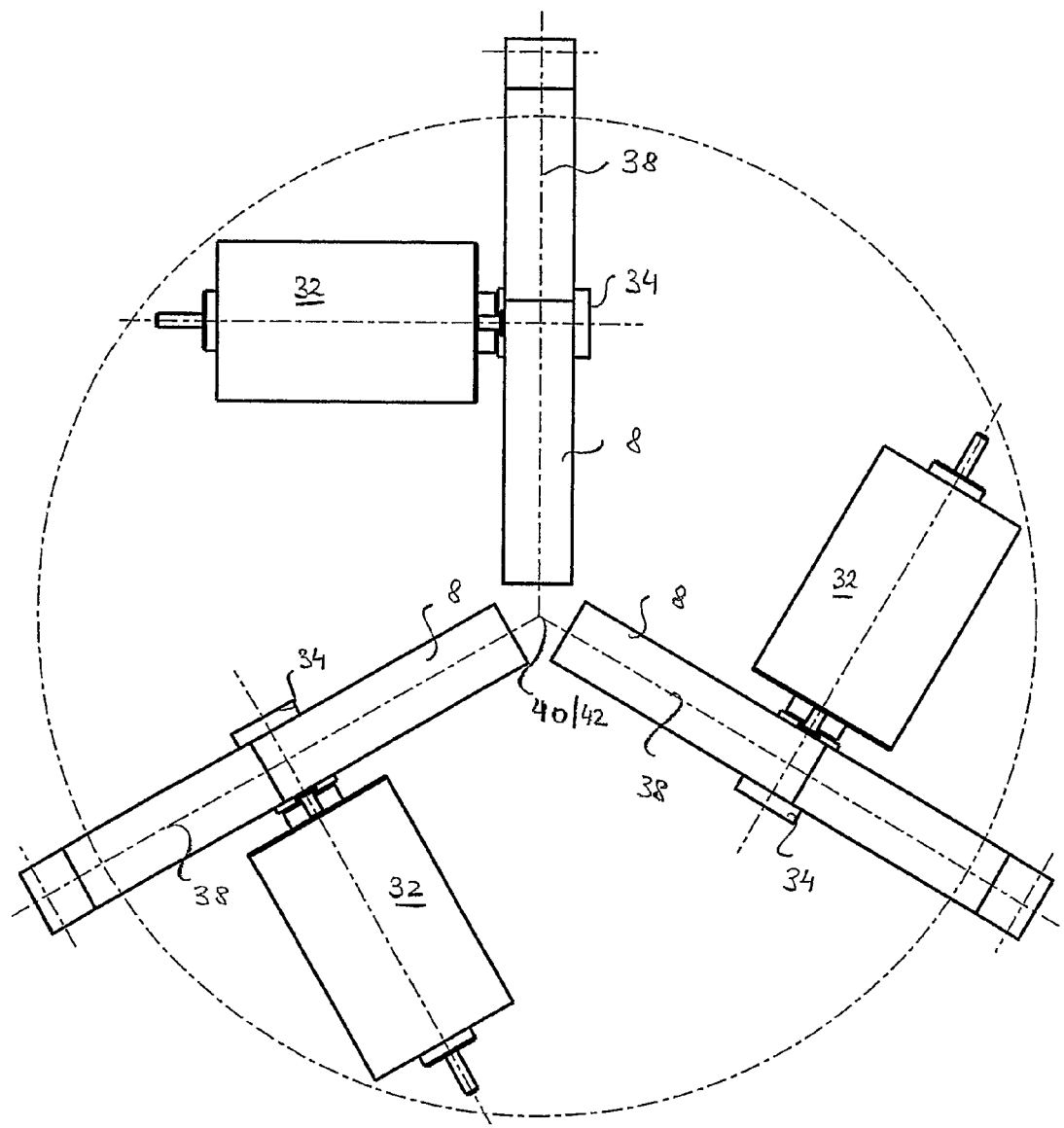
Figure 4:
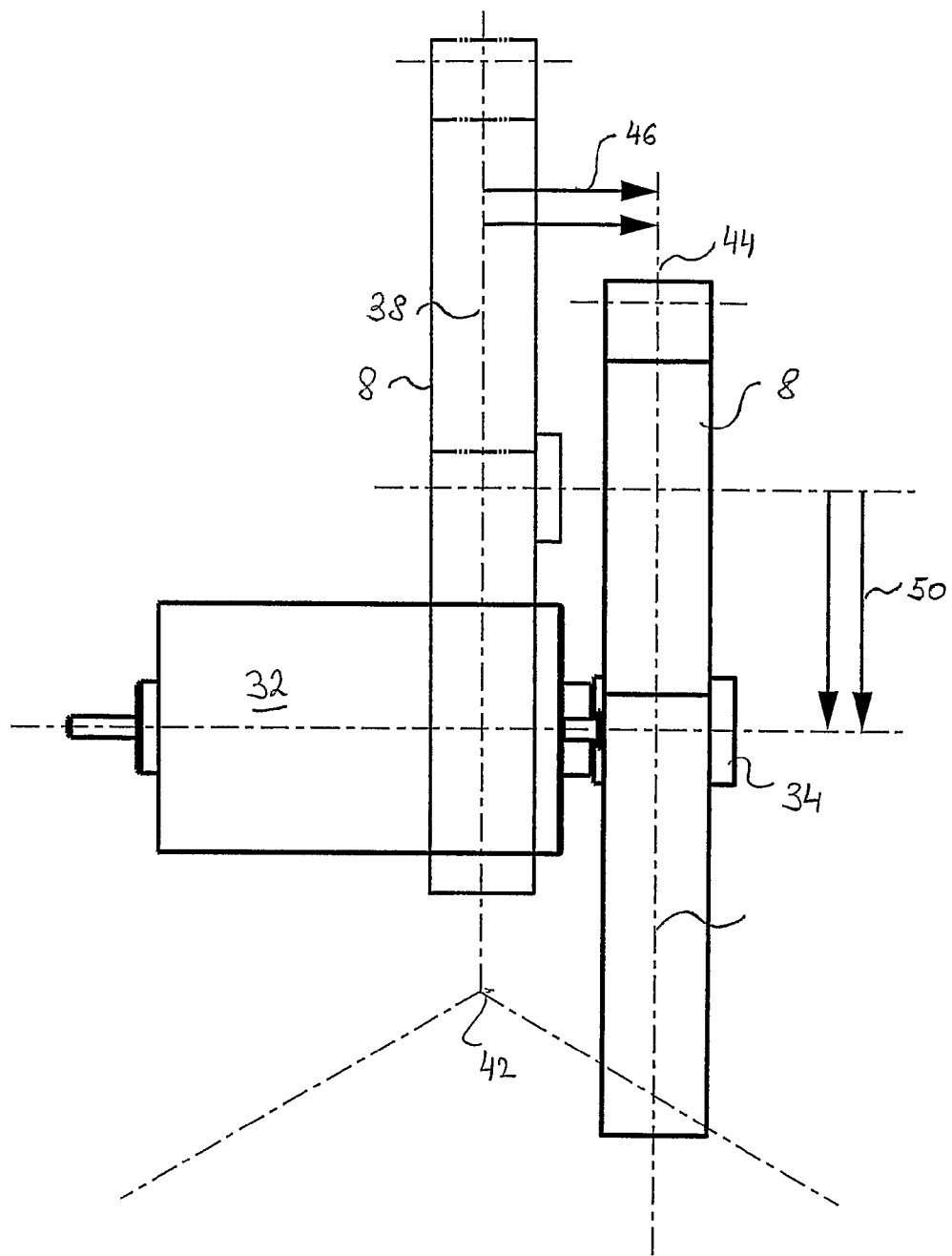
Figure 5:
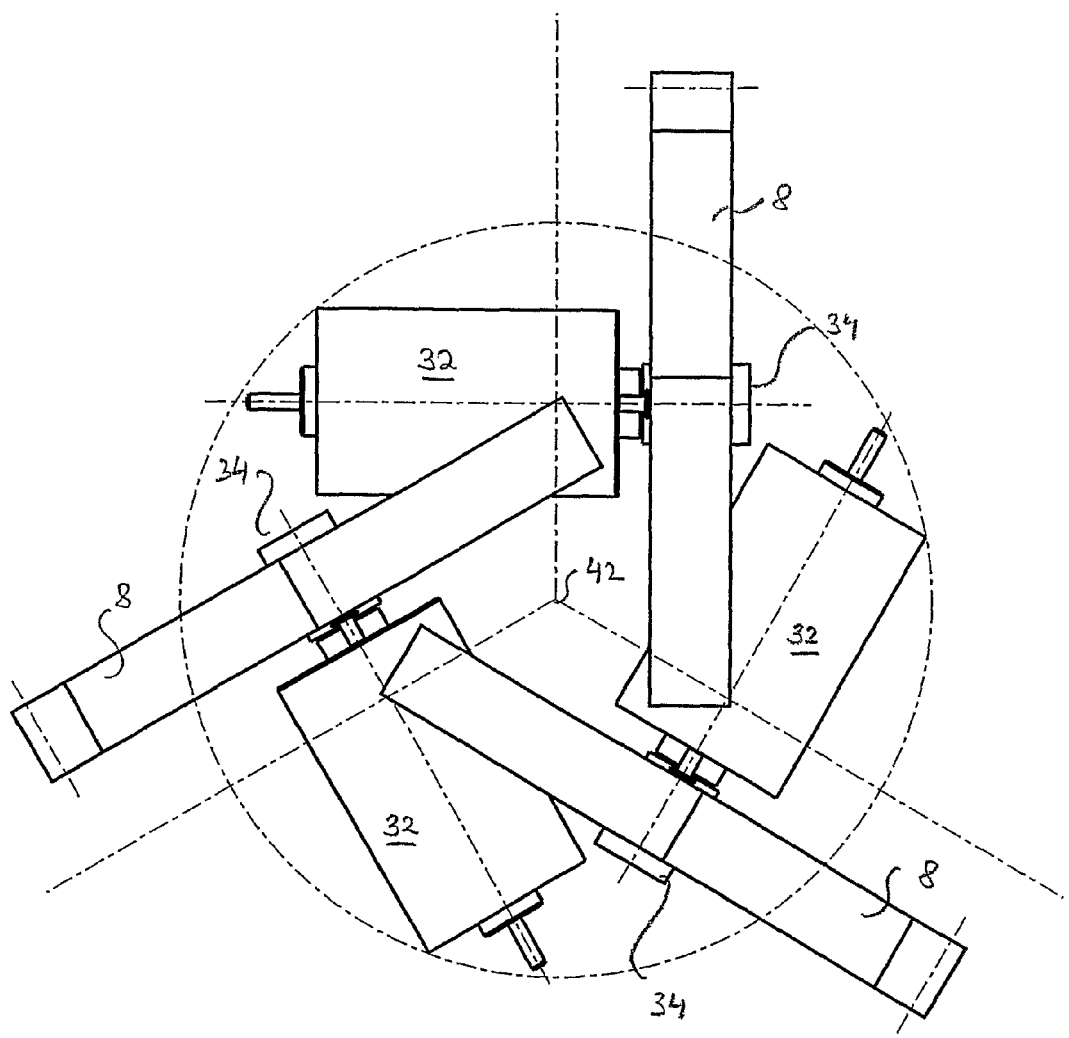

With reference to FIGS. 3 to 5, an arrangement, according to a preferred embodiment of the present invention, of the first arms 8, the mounting members 26 and the actuators 32 according to the present invention is explained.

Here, some preliminary remarks will support the understanding. Devices the present invention relates to and some of the prior art devices for transmitting movements have a center of symmetry with respect to possible movements of its moveable member or the degrees of freedom of the moveable member, respectively.

Each of the kinematics chains connected between the base member and the moveable member may be moved in a movement plane. In particular, usually the first or main arms of the kinematics chains, i.e. the part of a kinematics chain connected to the base member, may be moved in the respective movement plane.

Movements the second arms of the kinematics chains, i.e. the part of a kinematics chain connected to the moveable member, may usually occur in a different plane or in a movement space.

The symmetry center is, in one embodiment, positioned such that a line perpendicularly extending through the center of the base member intersects the symmetry center. For the sake of simplicity only, in the following it is assumed that this relation is given for the preferred embodiment. However, any other relation or positioning of the symmetry axis is also possible.

FIG. 3 shows the first arms 8 in an arrangement as such not used with the present invention, but common for prior art devices. It has to be noted that FIG. 3 may be considered as prior art arrangement only with respect to the spatial arrangement of first arms. But is has to be appreciated that the first arms 8 of the present invention are not known from the prior art.

Each of the first arms 8 is moveable in a movement plane 38 each thereof indicated by a dotted line in FIG. 3. As known, the first arms are arranged such that their movement planes 38 intersect at a common line or axis 40 (referred to as "symmetry axis") perpendicularly extending through the base member, here through the center 42 of the base member. In this embodiment, the intersecting or symmetry axis goes right through the center of symmetry with respect to possible movements of the moveable member 4 (not shown) or the degrees of freedom of the moveable member, respectively.

This prior art arrangement is not used in the present invention. Rather, according to the present invention, the first arms 8 and, along therewith, associated the mounting members 26 and actuators 32 are arranged in a manner shown in FIG. 4.

In particular, at least one of the first arms 8 is positioned such that its movement plane is—compared with the movement planes 38 of FIG. 3—offset in a direction perpendicular resulting in a movement plane 44. This is illustrated by arrow 46 in FIG. 4.

Further, the first arm(s) 8 is (are) positioned such its (their respective) rotation axis (axes) is (are) moved—in the movement plane 44—in an inward direction or the towards the center 42 of base member 2. This is illustrated by arrow 50 in FIG. 4.

A positioning of each of the first arms 8 in the above described manner leads to a preferred embodiment shown in FIG. 5.

As a result, each arm's movement plane 44 positioned according to the present invention does not intersect the common symmetry axis of the movement planes, but extends in a spaced relation thereto, i.e. there is a distance d>0 between the movement plane 44 and the symmetry axis.

In other words, the intersection of the movement plane 44 of a first arm 8 positioned according to the present invention and the movement plane 38/44 of another first arm, which may be positioned according to the present invention or not, forms a line not intersecting with their common symmetry axis, but extends in a spaced relation thereto, i.e. there is a distance d>0 between the planes' intersection line and the symmetry axis. Accordingly, in the embodiment of FIG. 5 each movement plane 44, all thereof positioned according to the present invention, extends in a spaced relation thereto.

This allows a more compact design particularly because the distances between the rotational axes of the first arms 8 and the center of the base member 2 or the symmetry axis may be reduced. As a result, the lateral space occupied by the device according to the present invention is reduced as compared with prior art devices and allows, for example, to use smaller housings.

For the typical case of a haptic desktop device wherein the effective radius of movement of the first arms is about equal to the first arm's radial length the lateral space reduction achieved by the present invention reaches a factor of about 2 in diameter; as regards the surface, the reduction achieved by the present invention reaches about factor 4.

A preferred embodiment for the first arms 8 and their arrangement within the device according to the present invention are now explained with reference to FIGS. 6 and 7.

The first arm 8 includes a curved portion 52, here in form of a segment of an annulus. Irrespective of the curvature of the curved portion 52, it is preferred that the rotational center 54 of the first arm 8 coincides or nearly coincides with the center of a virtual line connecting the ends of the curved portion 52. In the embodiment shown in FIGS. 6 and 7, the center of the curved portion 52 further corresponds with the center (middle) of a virtual annulus having curvature of the curved portion 52; this relation may also exist for different curvatures of the curved portion 52.

A base portion 56 of the first arm 8 extends from a first end 58 of the curved portion 52 and is rotateably coupled to the mounting member 26, wherein the location of the coupling of the base portion 56 and mounting member 26 on the base portion defines the rotational center 54 of the first arm 8. In the preferred embodiment, the base portion 56 is a straight portion. However, the base portion 56 may also be a curved portion.

Figure 6:
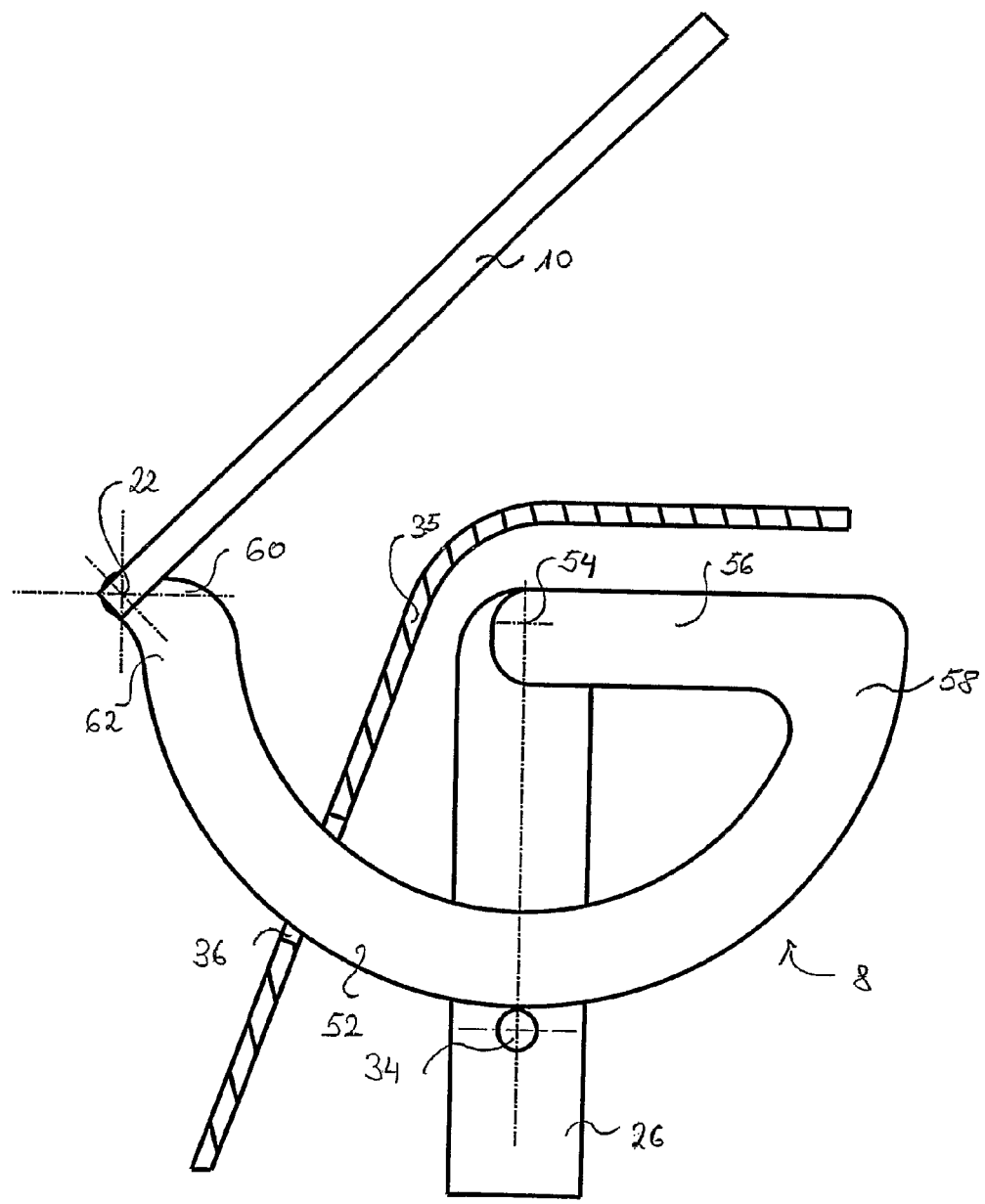
Figure 7:
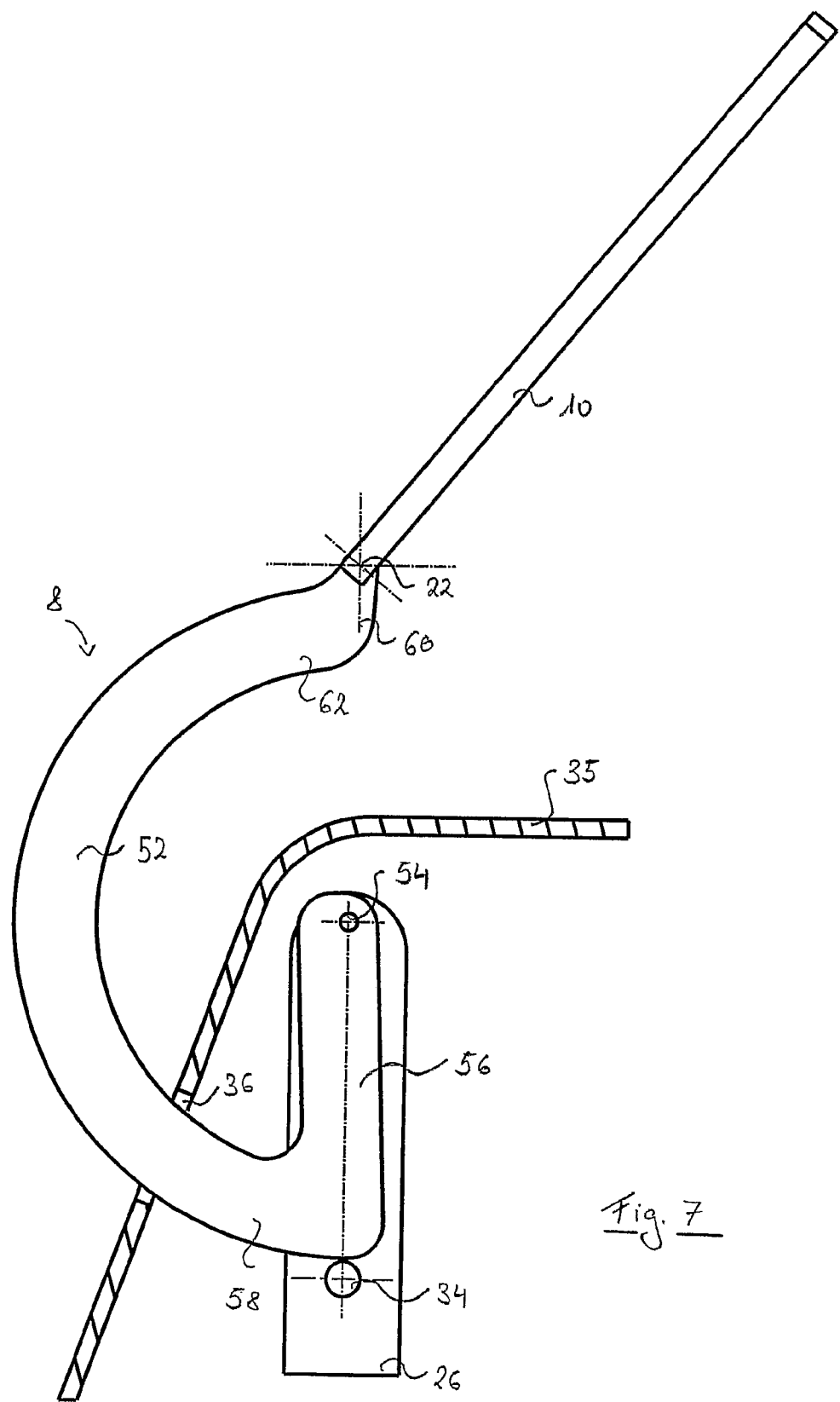

The embodiment of FIGS. 6 and 7 includes an optional end portion 60 of the first arm 8 extending from a second end 62 of the curved portion 52. The end portion 60 couples the curved portion 52 and the respective second arm 10 for example by a hinge. In particular, in case of a flexible hinge, the end portion 58 and the hinge may be formed of one piece or may be provided as an integrally formed member. In further preferred embodiments not including end portion 60, the curved portion 52 and the second arm 10 may be directly coupled. Here, in case of a hinge for this coupling, the hinge and the second end 62 of the curved portion 52 and/or the hinge and the second arm 10 may be formed from one piece.

FIG. 6 shows the first arm 8 in a first end position and FIG. 7 shows the first arm 8 in a second end position. Transitions between the end positions are achieved by rotations of the first arm 8. As may be derived from these figures, movements of the first arm 8 are such that movements of parts of the curved portion 52 passing area through housing 35 during may be considered as linear movements at that location. Therefore, the opening 36 of the housing 35 may have a dimension to accommodate the (largest) cross-section of curved portion 52.

In same applications, the preferred embodiment of the first arm 8, particularly of the curved portion 52, may result in a sub-optimal torsion and binding stiffness of the first arm 8. If this is the case, an appropriate cross-section of curved portion 52 may be used for compensation. Further measures to influence the range of movements of the second arm(s) include to locate the coupling between the first arm 8 and the second arm 10 at a distance smaller, equal or greater to the rotational center 54. This may be achieved by an appropriate design of the end portion 60, e.g. extending from the second end 62 of the curved portion 54 towards the rotational center 54 or in an opposite direction.

Preferred embodiments to move the first arms 8 are described below, some thereof with reference to FIGS. 8 to 10.

In a preferred embodiment not shown, the output shaft 34 of the actuator 32 and the curved portion 52 are in frictional contact or frictional engagement. Preferably, friction between the output shaft 34 and the curved portion 52 ensures that rotations of the output shaft 34 are sufficiently (preferably always) transmitted to the curved portion 52 and, thus, to the first arm 8. Rotation of the output shaft 34 results in movements of the first arm 8 and, thus, the whole kinematics chain 6. In order to improve the engagement of the output shaft 34 and the first arm 8, the output shaft 34 itself or a coating formed thereon may have a high coefficient of friction. In addition or as alternative, the parts of the curved portion 52 provided for contact with the output shaft 34 or a coating formed thereon may have a high coefficient of friction.

Further, it is contemplated to bias the output shaft 34 and the first arm 8 with respect to each other. This compensates motor torque loss due to gravity and, for example, also enhance their frictional engagement. Biasing may be accomplished, for example, by applying forces on the output shaft 34 acting in a direction towards the first arm 8 and/or vice versa. This may be for example achieved by flexible bearings and/or elastic spring elements. Therefore, this is also contemplated for any other embodiment according to the present invention.

In a further not shown preferred embodiment, the output shaft 34 of the actuator 32 is formed as toothed wheel, gear, gearwheel or may have a waved surface, while the parts of the curved portion 52 provided for contact with the output shaft 34 are formed to have a complementary surface. This will avoid or minimize skid between the first arm 8 and the output shaft 34.

Figure 8:
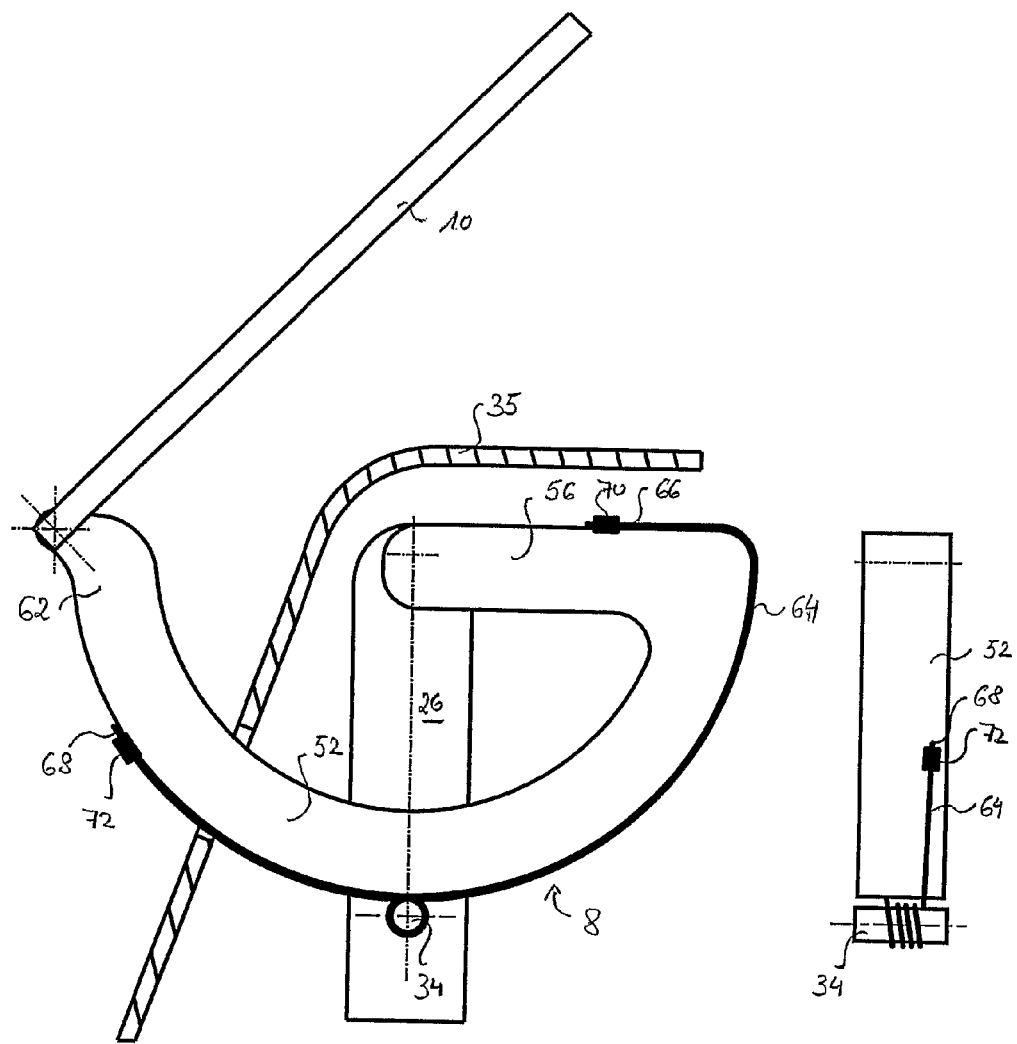
Figure 9:
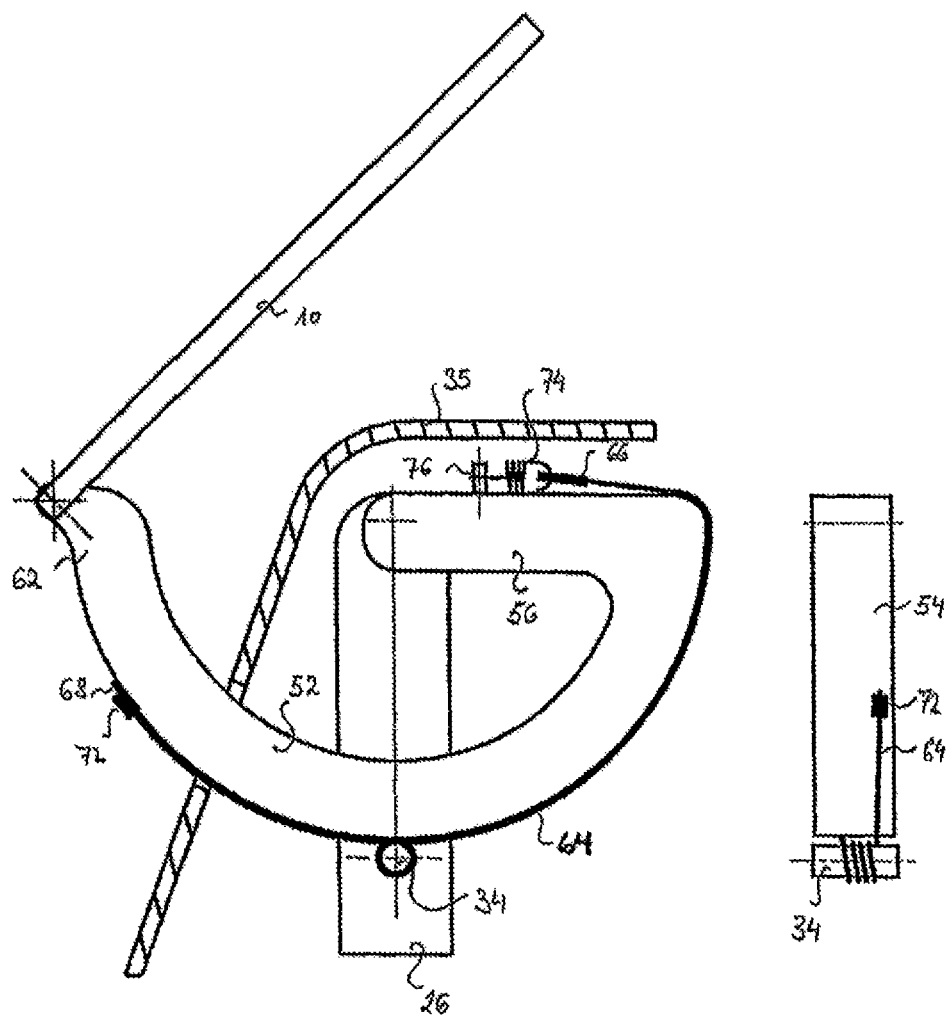
Figure 10:
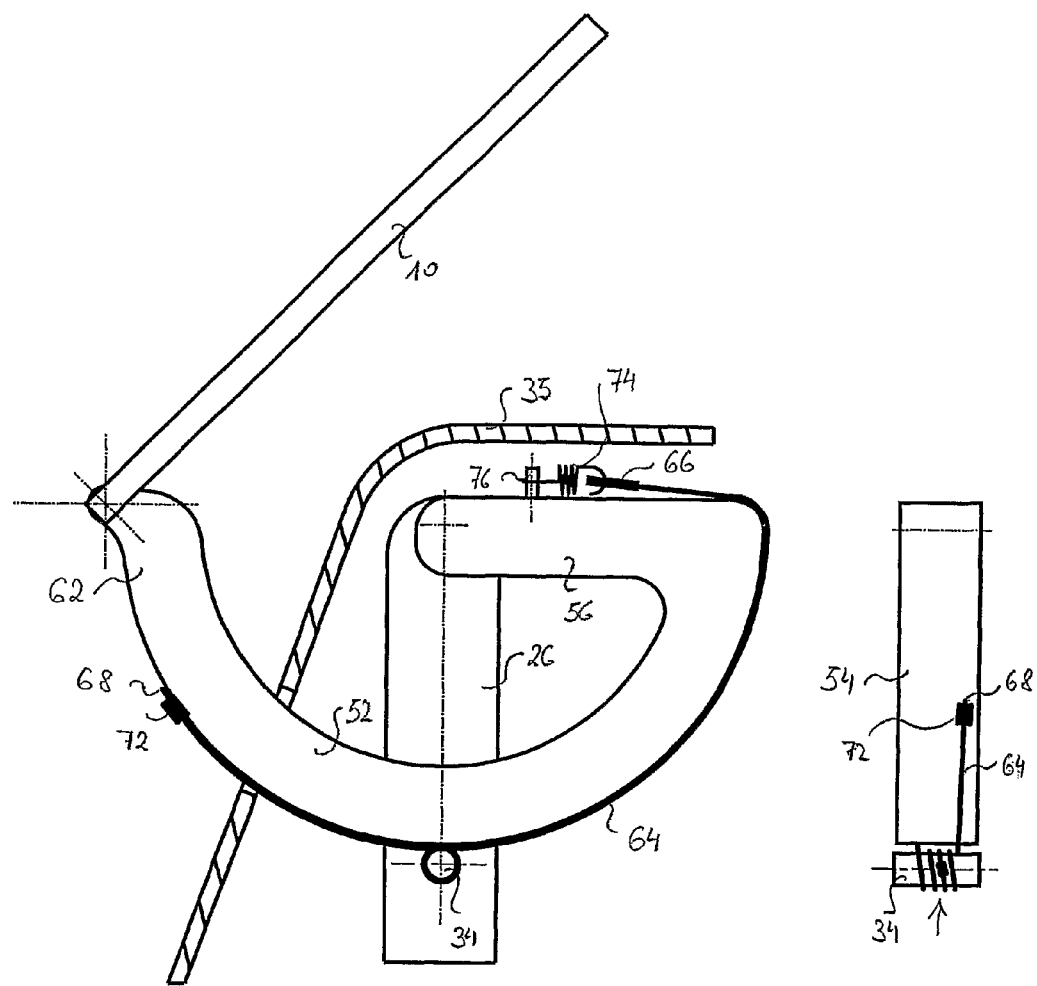

In preferred embodiments shown in FIGS. 8 to 10, coupling of the output shaft 34 and the first arm 8 is cable-based or wire-based.

In the preferred embodiment of FIG. 8, the first arm 8 is provided with a cable 64. It is also contemplated to use a toothed belt or gear transmission instead of the cable 64 and further cables described below, respectively.

The cable 64 extends from the base portion 56 along the curved portion 52 to a location of the curved portion 52—seen in the direction from the base portion 56 along the outer surface of the curved portion 52 to its second end 62—beyond the output shaft 34. Both ends 66 and 68 of the cable 64 are fixedly mounted to the first arm 8.

For coupling the first arm 8 and the output shaft 34, the cable 64 is wound at least once around output shaft 34, as shown in the right part of FIG. 8.

To obtain sufficient friction between the cable 64 and the outer surface of the output shaft 34, it is intended to tighten or tension the cable 64. To this end, it is preferred to use clamps 70 and 72 for attaching the ends 66 and 68, respectively, of the cable 64 to the first arm 8.

In order to improve the engagement of the output shaft 34 and the first arm 8, the output shaft 34 itself or a coating formed thereon may have a high coefficient of friction. In addition or as alternative, the parts of the cable 64 provided for contact with the output shaft 34 or a coating formed thereon may have a high coefficient of friction.

The preferred embodiment illustrated in FIG. 9 essentially corresponds with the embodiment of FIG. 8 apart from the following differences and similar features are not described again.

As shown in FIG. 9, a spring 74 is arranged between the end 66 of the cable 64 and a support 76 provided on the base portion 56 of the first arm 8. The spring 74 permanently biases or tensions the cable 64 to an extent such the cable 64 firmly engages the output shaft 34. This ensures a secure coupling of, on the one hand, the output shaft 34 and, on the other hand, the cable 64 and, thus, the first arm 8. The elastic tensioning means can be a helical traction spring, as shown in FIG. 9, but any other elastic element can be used (e.g. helical compression spring, beam element, membrane, etc.

The preferred embodiment illustrated in FIG. 10 essentially corresponds with the embodiments of FIGS. 8 and 9 apart from the following differences and similar features are not described again.

As shown in FIG. 10 (right side), the cable 64 is fixed or anchored to the output shaft 34, for example by soldering, welding, an adhesive, a clamp or the like. This is a further measure ensuring that the output shaft 34 and the cable 64 and, thus, the output shaft 34 and the first arm 8 are firmly coupled.

Figure 11:
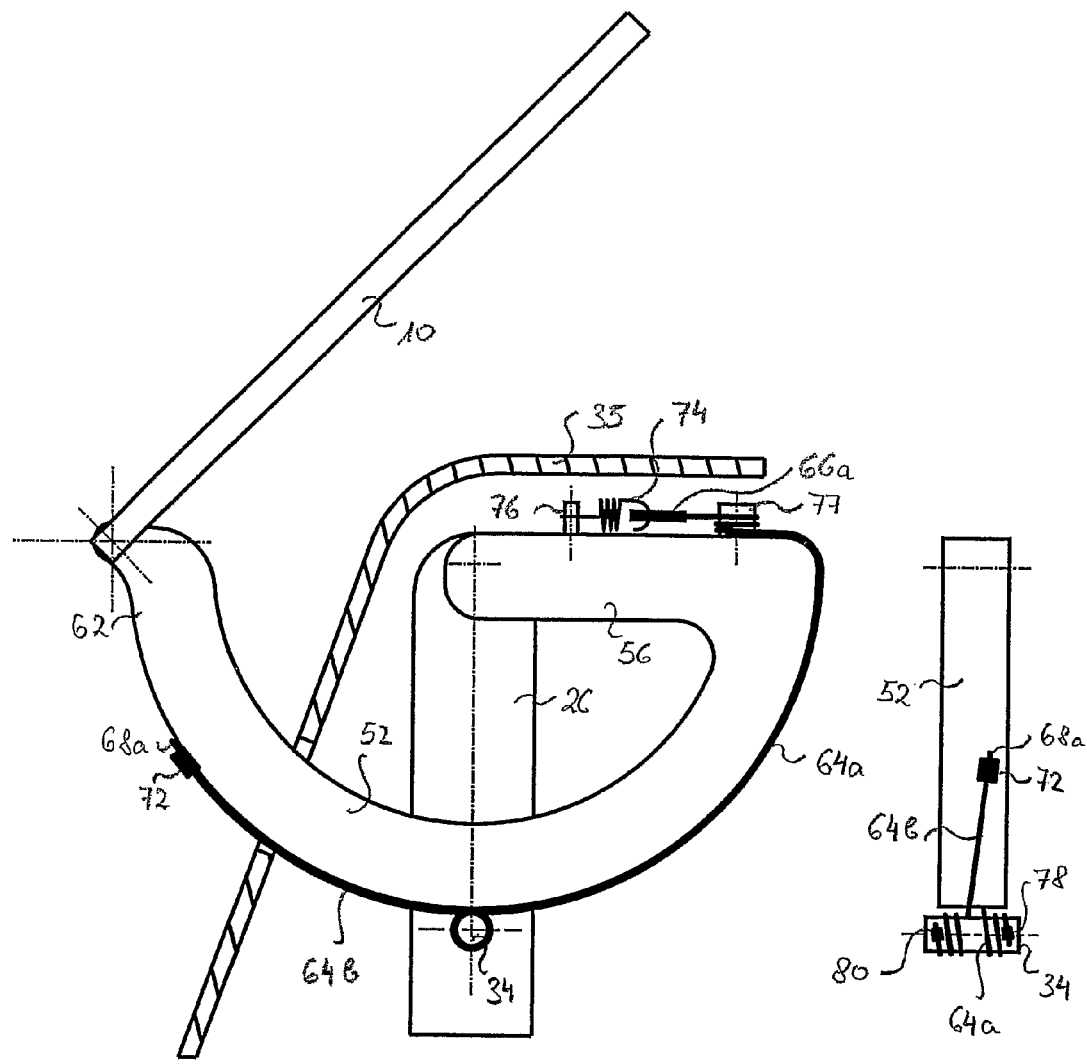

The preferred embodiment illustrated in FIG. 11 essentially corresponds with the embodiments of FIGS. 8 to 10 apart from the following differences and similar features are not described again.

In the preferred embodiment illustrated in FIG. 11 (in particular shown in the right part of FIG. 11), two cables 64a and 64b are used instead of the cable 64.

One end 66a of the cable 64a is coupled to the base portion 56 of the first arm 8 like the end 66 of the cable 64 in the embodiment of FIGS. 10 and 11, i.e. a spring 74 is arranged between the end 66a of the cable 64 and a support 76 provided on the base portion 56 of the first arm 8. In addition, the cable 64a is guided at least once around a slipping capstan 77. This allows a higher apparent cable stiffness as seen from the actuator, due to capstan friction and allows for a smaller tensioning force (and therefore a smaller elastic element.

Using a capstan as illustrated in FIG. 11 is also contemplated for the embodiments of FIG. 8 to 10.

Alternatively, the end 66a may be attached to the base portion in a manner comparable to the embodiments of FIG. 8 to 10.

Another end 78 of the cable 64a is fixedly attached to the output shaft 34, for example by soldering, welding, an adhesive, a clamp or the like.

The cable 64a is wound around the output shaft 34 in a winding direction.

One end 68a of the cable 64b is attached to the curved portion 52 of the first arm 8 like in is attached to the first arm 8 like the end 68 of the cable 64 in the embodiments of FIGS. 9 and 10.

Another end 80 of the cable 64b is fixedly attached to the output shaft 34, for example by soldering, welding, a clamp or the like.

The cable 64b is also wound around the output shaft 34, however, starting from the opposite side in the same winding direction.

As a result, a rotation of the output shaft 34 effects that the cable 64a is un-winded from the output shaft 34 and the cable 64b is winded up the output shaft 34 or vice versa. This allows a even narrower design of a device according to the present invention.

This coupling of the cables 64a and 64b and the output shaft 34 further enhances the coupling quality between the first arm 8 and the output shaft 34, particularly due to a reduced risk of skid and an improved friction.

As an alternative, the ends 78 and 80 of the cables 64a and 64b may be coupled to the output shaft 34 by winding the cables 64a and 64b on the output shaft 34 as set forth above, instead of fixing the ends 78 and 80 to the output shaft 34, to guide at least one of the cables 64a and 64b through a passage extending through the output shaft 34 in a direction perpendicular to its longitudinal axis and to connect the ends 78 and 80 together.

For all above embodiments is also contemplated to arrange the coupling means, which have been described to be arranged on the base portion, on the curved portion, and to arrange the coupling means, which have been described to be arranged on the curved portion, on the base portion.

The principles explained with reference to FIG. 8 to 11 are however not only applicable in devices for transmitting movements of the type the present invention relates to. Rather, the principles and the underlying teaching provide, in general terms, a movement transmission member for transmitting movements comprising a base portion, a curved portion and an end portion. Details given above with respect to base portion, curved portion and end portion of the first arms also apply to here.

The movement transmission member has a rotational axis extending through the base member, while the end portion is adapted to provide movements to be transmitted to a further member, for example a second arm 10.

The curved portion is spaced apart from the rotational axis of the movement transmission member and linked with the rotational axis via the base portion. Thus, rotation of the movement transmission member about its rotational axis results in rotation of the curved member and vice versa.

The curved portion is adapted to be engaged by a device or unit providing rotational movements such as a rotational actuator, an electric motor, an output shaft and the like. It is preferred that engagement of the curved portion and such device incorporated one of the above described embodiments concerning coupling of the first arms 8 and the actuator 32.

Preferred embodiments may be in the form of a haptic device, manipulator or measuring system.

In case of a haptic device, the moveable member 4 is coupled with a handle. In case of a manipulator, the moveable member 4 is coupled with a manipulation member. In case of a measuring system, the first arm is coupled with a sensor element, wherein the position of the moveable member is calculated based on the results of the measurement. In FIG. 1, a handle, a manipulation member and a sensor element are illustrated by the component designated by reference numeral 82.

A haptic device embodiment according to the present invention comprises a device according to the present invention in one of the embodiments described above. Such a haptic device may be used as an active interface applying tactile sensation and control to interaction with computer applications or the like. Haptic devices provide users with force-feedback information during the motion and/or force that they generate. A haptic or force feedback device according to the present invention provides three translational degrees of freedom. In addition, up to three rotational degrees of freedom may be provided by a rotational wrist module 82 coupled in series with the movement transmission device according to the present invention. Rotation may be provided by rotational coupling 84 of the wrist module 82 and the moveable member. The user may interact with the haptic device by means of the wrist module 82 or a handle located at the top of the wrist module 82. Preferable, the wrist module is adapted to provide tactile feedback.

A haptic device according to the present invention may further comprise a sensor for measuring the aperture angle of each first arm 8 and a processor for calculating the position of the moveable member 4 based on the results of the measurement.

It is also contemplated to provide control keys, control wheels, force grippers or other elements used for a human computer interface and/or a force sensor arranged at the movable member preferably located underneath the wrist module 82.

A manipulator according to the present invention incorporating an embodiment of the movement transmission device according to the present invention provides movements of three translational and one rotational degree of freedom to a gripper. The parallel kinematics chains 6 provide three translational degrees of freedom to the movable member 4. A manipulation member 82 such as a gripper assembly is coupled with the movable member 4 in series such that the manipulation member 82 may be rotated in relation to the base member 2. This may be achieved by rotational coupling 84 and/or by providing the movable member 4 with a rotation axis permitting a rotation about the vertical axis of the whole structure.

In a further embodiment, a manipulator according to the present invention may also comprise force sensors such to detect the forces or torque in each direction. Obviously, a manipulator according to the present invention may comprise any other kind of gripper, tool, or other end effector.

A measuring system according to the present invention, for example to measure coordinates, incorporates a movement transmission device according to the present invention providing movements of three translational degrees of freedom to a probe or sensor element 82. Here, it is possible to omit rotational coupling 84.

Figure 12:
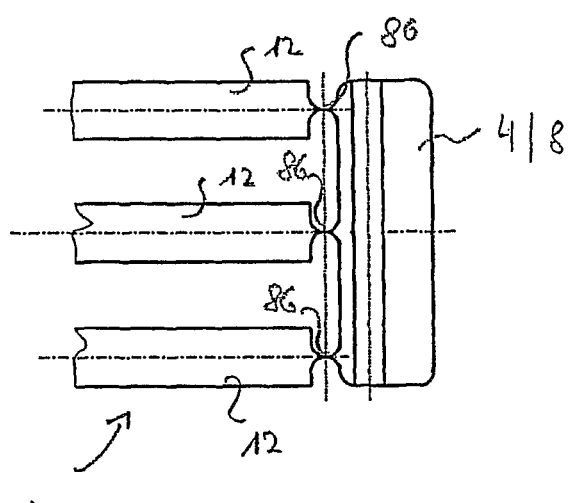

FIG. 12 shows a preferred embodiment for an elastic coupling of first and second arms 8 and 10 and/or the second arms 10 and the moveable member 4. Here, the second arm 10 comprises three linking bars 12 ends of which shown in FIG. 12. The ends of the linking bars 12 are coupled with the first arm 8 or the moveable member 4 by three elastic hinges or elastic hinge articulations 86. The elastic hinges 86 may be formed as separate components or formed with the linking bars 12 from one piece. It is also possible to form the second arm 10 and the first arm 8 and/or the moveable member 4 from one piece. In case of a one-piece embodiment, the elastic hinges 86 may be formed as material tapering.

Although the invention has been described herein with respect to specific embodiments thereof, the appended claims are not to be construed as limited to those embodiments, but rather to include any modifications and variations of the invention which may occur to one of ordinary skill in the art which fairly fall within its scope.

The invention claimed is:

1. A parallel kinematics transmission structure adapted to provide at least three degrees of freedom including three translational degrees of freedom, comprising: a base member, a moveable member and at least three parallel kinematics chains coupling the base member and the moveable member, the at least three parallel kinematics chains each having a first arm having a first end and a second end, and a second arm, each second arm coupled to the second end of one of the first arms and the moveable member, each first arm being rotatable about a rotation axis, the second end of each first arm being moveable in a respective movement plane that is perpendicular to the respective rotation axis, wherein the movement planes of the first arms do not intersect each other at a common symmetry axis.

2. The device according to claim 1, wherein at least one second arm comprises at least two parallel linking bars.

3. The device according to claim 1, wherein at least one first arm is coupled to the base member.

4. The device according to claim 1, wherein at least one first arm comprises a curved portion.

5. The device according to claim 4, wherein the curved portion forms a segment of an annulus, the center of the annulus being intersected by the rotation axis.

6. The device according to claim 4, wherein the at least one first arm comprises a base portion extending from a first end of the curved portion.

7. The device according to claim 6, wherein the base portion extends from the first end of the curved portion in a direction radial with respect to the curved portion.

8. The device according to claim 7, wherein the first end of the at least one first arm is rotationally mounted to a mounting member extending from the base member.

9. The device according to claim 1, further comprising an actuator configured to move at least one first arm in its respective movement plane.

10. The device according to claim 9, wherein the actuator and the at least one first arm are coupled for moving the at least one first arm.

11. The device according to claim 9, wherein the actuator is coupled to the curved portion of the at least one first arm.

12. The device according to claim 9, wherein the actuator has a rotational axis that is perpendicular to the movement plane of the at least one first arm.

13. The device according to claim 9, wherein the actuator comprises a body and an output shaft extending therefrom, the actuator being coupled to the at least one first arm by at least one of a friction engagement, at least one cable, or at least one wire.

14. The device according to claim 9, wherein the actuator is mounted to a mounting member extending from the base member.

15. The device according to claim 4, further comprising a housing having an opening, wherein the curved portion of the at least one first arm is adapted to be movable through the opening.

16. The device according to claim 15, wherein the opening has dimensions to accommodate a cross-section of the at least one first arm such that the corresponding parallel kinematics chain can be moved through the opening.

17. The device according to claim 1, wherein at least one of the parallel kinematics chains comprises a flexible hinge.

18. The device according to claim 1, wherein at least one first arm is coupled to the base member by at least one flexible hinge.

19. The device according to claim 1, wherein at least one second arm is coupled to the moveable member by at least one flexible hinge.

20. The device according to claim 17, wherein the first arm and the second arm of at least one parallel kinematics chain are coupled by at least one flexible hinge.

21. The device according to claim 17, wherein the flexible hinge is made from one piece or the flexible hinge and at least one of the base member, the respective first arm, the respective second arm and the moveable member are made from one piece.

22. A haptic device for providing a user with force-feedback information, comprising a device according to claim 9.

23. The haptic device according to claim 22, further comprising a sensor for measuring the aperture angle of at least one first arm, wherein positions of the moveable member are calculated based on the results of the measurement.

24. The haptic device according to claim 22, further comprising a wrist module arranged in series with the parallel transmission structure and adapted to provide at least one rotational degree of freedom.

25. The haptic device according to claim 24, wherein the wrist module is adapted to provide tactile feedback.

26. The haptic device according to claim 22, further comprising control keys, control wheels, force grippers or other elements used for a human computer interface.

27. The haptic device according to claim 22, further comprising a force sensor coupled to the moveable member.

28. A manipulator for providing movements of at least one degree of freedom to a manipulation member, comprising a device according to claim 1.

29. A measuring system for providing at least one degree of freedom to a sensor element, comprising a device according to claim 1.

30. The device according to claim 1, wherein the parallel kinematics transmission structure is adapted to provide at least one rotational degree of freedom.

31. The device according to claim 9, wherein the actuator is coupled to the at least one first arm by a cable, the device further comprising a tensioner configured to tension the cable.

32. The device according to claim 31, wherein the tensioner resiliently biases the cable.

33. The device according to claim 31, wherein the tensioner is a spring disposed between the at least one first arm and the cable.

34. The device according to claim 1, wherein the base member is disposed in a base plane, and wherein each of the respective movement planes of the first arms are substantially perpendicular to the base plane.

35. The device according to claim 1, wherein each of the first arms have only one rotational degree of freedom.

36. The device according to claim 1, wherein each second arm has a first end having a midpoint and a second end having a midpoint, the first end of each second arm being coupled to one of the first arms and the second end of each second arm being coupled to the moveable member, the midpoint of the first end of each second arm and the midpoint of the second end of each second arm being located along a respective central arm axis, and wherein no central arm axis intersects another one of the central arm axes.

* * * * *